(12) United States Patent
Duesterberg

(10) Patent No.: US 10,705,991 B2
(45) Date of Patent: Jul. 7, 2020

(54) CIRCUIT FOR GENERATING A SAMPLING SIGNAL FOR A UART INTERFACE, AND BY COMPARING VALUES STORED IN PERIPHERAL CLOCK MEMORY

(71) Applicant: Lenze Automation GmbH, Aerzen (DE)

(72) Inventor: Dirk Duesterberg, Emmerthal (DE)

(73) Assignee: Lenze Automation GmbH, Aerzen (DE)

( * ) Notice: Subject to any disclaimer, the term of this patent is extended or adjusted under 35 U.S.C. 154(b) by 0 days.

(21) Appl. No.: 16/482,074

(22) PCT Filed: Jan. 29, 2018

(86) PCT No.: PCT/EP2018/052036
§ 371 (c)(1),
(2) Date: Jul. 30, 2019

(87) PCT Pub. No.: WO2018/141663
PCT Pub. Date: Aug. 9, 2018

(65) Prior Publication Data
US 2019/0384727 A1 Dec. 19, 2019

(30) Foreign Application Priority Data
Jan. 31, 2017 (DE) .......................... 10 2017 201 537

(51) Int. Cl.
*G06F 13/00* (2006.01)
*G06F 13/16* (2006.01)
(Continued)

(52) U.S. Cl.
CPC ............ *G06F 13/1689* (2013.01); *G06F 1/08* (2013.01); *G06F 13/4282* (2013.01)

(58) Field of Classification Search
CPC .................................................. G06F 13/1689
See application file for complete search history.

(56) References Cited

U.S. PATENT DOCUMENTS 6,707,332 B1   3/2004  Lee
9,971,666 B2 * 5/2018  Mishra ................ G06F 11/3051
(Continued)

FOREIGN PATENT DOCUMENTS

DE   20 2011 052 538 U1   2/2012
DE   10 2012 112 672 A1   6/2014

OTHER PUBLICATIONS

International Search Report (PCT/ISA/210) issued in PCT Application No. PCT/EP2018/052036 dated Apr. 16, 2018 with English translation (five pages).
(Continued)

*Primary Examiner* — Tammara R Peyton
(74) *Attorney, Agent, or Firm* — Crowell & Moring LLP

(57) ABSTRACT

A circuit for generating a sampling signal for a UART interface has an input terminal designed to receive a peripheral clock, an output terminal designed to output the sampling signal, a bit rate memory designed to store a value corresponding to a desired bit rate of the UART interface, a peripheral clock memory designed to store a value corresponding to a frequency of the peripheral clock, a sum memory designed to store a sum value, and a computing unit. The computing unit compares a comparison value, which is dependent on the sum value stored in the sum memory, with a threshold value, which is dependent on the value stored in the peripheral clock memory. The result of the comparison is taken as a basis for generating the sampling signal at a first level or a second level. In step with the peripheral clock and on the basis of the result of the comparing, the sum value stored in the sum memory is altered by the value stored in the bit rate memory or the sum value stored in the sum memory is altered by a value that is dependent on the value stored in the peripheral clock memory.

6 Claims, 1 Drawing Sheet

(51) Int. Cl.
    *G06F 1/08*          (2006.01)
    *G06F 13/42*       (2006.01)

(56) References Cited

U.S. PATENT DOCUMENTS

| | | |
|---|---|---|
| 10,228,717 B2 | 3/2019 | Uppenkamp et al. |
| 2004/0130361 A1 | 7/2004 | Ruat et al. |
| 2008/0136538 A1 | 6/2008 | Marques |

OTHER PUBLICATIONS

German-language Written Opinion (PCT/ISA/237) issued in PCT Application No. PCT/EP2018/052036 dated Apr. 16, 2018 (six pages).

\* cited by examiner

CIRCUIT FOR GENERATING A SAMPLING SIGNAL FOR A UART INTERFACE, AND BY COMPARING VALUES STORED IN PERIPHERAL CLOCK MEMORY

BACKGROUND AND SUMMARY OF THE INVENTION

The invention relates to a circuit for generating a sampling signal for a UART interface and to a UART interface having such a circuit.

For data transmission between different communication subscribers, what are known as universal asynchronous receiver transmitter (UART) interfaces are frequently used. In a UART receiver, there is typically provision for a data sampling unit designed to take a sampling signal as a basis for sampling a data transmission line. Accordingly, the sampling signal can also be used for sending data. In order to be able to transmit the data between a transmitter and a receiver in as error-free a manner as possible, it is necessary for a frequency of the sampling signal to be adjustable both in the transmitter and in the receiver in as precisely concordant a manner as possible, wherein the frequency of the sampling signal corresponds to a bit rate of the UART interface. To generate the sampling signal, a peripheral clock, for example a processor clock, is frequently divided in a suitable manner. For a given peripheral clock, however, simple dividing of the peripheral clock does not allow arbitrary frequencies of the sampling signal, i.e. bit rates, to be generated.

The invention is based on the object of providing a circuit for generating a sampling signal for a UART interface and a UART interface that allow as precise an adjustment as possible for a frequency of the sampling signal for a given peripheral clock.

The invention achieves this object by way of a circuit for generating a sampling signal for or as part of a UART interface according to the claimed invention, and by a UART interface according to the claimed invention.

The circuit according to the invention is designed to generate a sampling signal for or as part of a UART interface, wherein a frequency of the sampling signal is adjustable and is derived from a peripheral clock.

The circuit has an input terminal to which a peripheral clock, for example a processor clock present in the system, can be applied as intended.

The circuit further has an output terminal at which the sampling signal is output.

The circuit further has a bit rate memory designed to store a value corresponding to a desired bit rate of the UART interface. The desired bit rate or an integer multiple of the bit rate can be stored in the bit rate memory in binary form, for example. In the event of a change in the bit rate, for example triggered by an adjustment process, the value stored in the bit rate memory is altered in accordance with the set bit rate.

The circuit further has a peripheral clock memory designed to store a, for example binary, value corresponding to a frequency of or modeling the peripheral clock.

The circuit further has a sum memory designed to store, for example to store in binary form, a variable sum value.

The circuit further has a computing unit or control unit.

The computing unit is designed to compare a comparison value, which is dependent on the sum value stored in the sum memory (and possibly on further variables), with a threshold value, which is dependent on the value stored in the peripheral clock memory (and possibly on further variables). The computing unit is designed to take the result of the comparing as a basis for generating the sampling signal at a first level or a second level. The first level can be consistent with a logic zero, for example, and the second logic level can be consistent with a logic one, for example. The computing unit is further designed so as, in step with the peripheral clock and on the basis of the result of the comparing, either to alter (to increase or decrease) the sum value stored in the sum memory by the value stored in the bit rate memory or to alter the sum value stored in the sum memory by a value, or to set said sum value to a value, that is dependent on the value stored in the peripheral clock memory.

In one embodiment, the computing unit is designed so as, in step with the peripheral clock, to check whether the comparison value is greater than/equal to or less than the threshold value. If the comparison value is less than the threshold value, the computing unit increases the sum value stored in the sum memory by the value stored in the bit rate memory. If the comparison value is greater than or equal to the threshold value, the computing unit sets the sum value stored in the sum memory to a value consistent with a difference between the comparison value and the threshold value.

In one embodiment, the bit rate memory is designed to store a value consistent with an integer multiple of the desired bit rate of the UART interface, for example 16 times the desired bit rate. If the desired bit rate is 4 Mbit/second, for example, the value stored in the bit rate memory can be 4*16=64, for example.

In one embodiment, the peripheral clock memory is designed to store a value consistent with the frequency of the peripheral clock. If the peripheral clock is 100 MHz, for example, the value stored in the peripheral clock memory can be 100, for example.

In one embodiment, the comparison value is equal to a sum of the sum value stored in the sum memory and the value stored in the bit rate memory.

In one embodiment, the circuit has a summator designed to sum the sum value stored in the sum memory and the value stored in the bit rate memory, and to output the sum at its output terminal as the comparison value. The circuit further has a subtractor designed to form a difference between the value stored in the peripheral clock memory and the sum output by the summator and to output the difference at its output terminal. The circuit further has a comparator designed to compare the value stored in the peripheral clock memory with the comparison value and to take the result of the comparing as a basis for generating the sampling signal at the first or the second level at its output terminal, which is connected to the output terminal of the circuit. The circuit further has a multiplexer that has its control input connected to the output terminal of the comparator, that has its first input connected to the output terminal of the subtractor, that has its second input connected to the output terminal of the summator and that takes the state of the sampling signal as a basis for outputting either the signal present at its first input or the signal present at its second input at its output terminal. The sum memory is in the form of a clock controlled, in particular edge controlled, register, for example in the form of a clock controlled flip-flop, wherein a clock input of the register has the peripheral clock applied to it and an input terminal of the register is connected to the output terminal of the multiplexer.

The invention further relates to a UART interface. The UART interface has at least one data transmission terminal, which is provided for connection to a data transmission line, for example. The UART interface further has a data sampling unit having a sampling control terminal, wherein the data sampling unit is designed to take a sampling signal present at the sampling control terminal as a basis for sampling a signal present at the data transmission terminal. The UART interface further has a circuit as described above, the output terminal of which is connected to the sampling control terminal of the data sampling unit.

BRIEF DESCRIPTION OF THE DRAWINGS

The invention is described in detail below with reference to the drawings, in which.

DETAILED DESCRIPTION OF THE DRAWINGS

Figure 1:
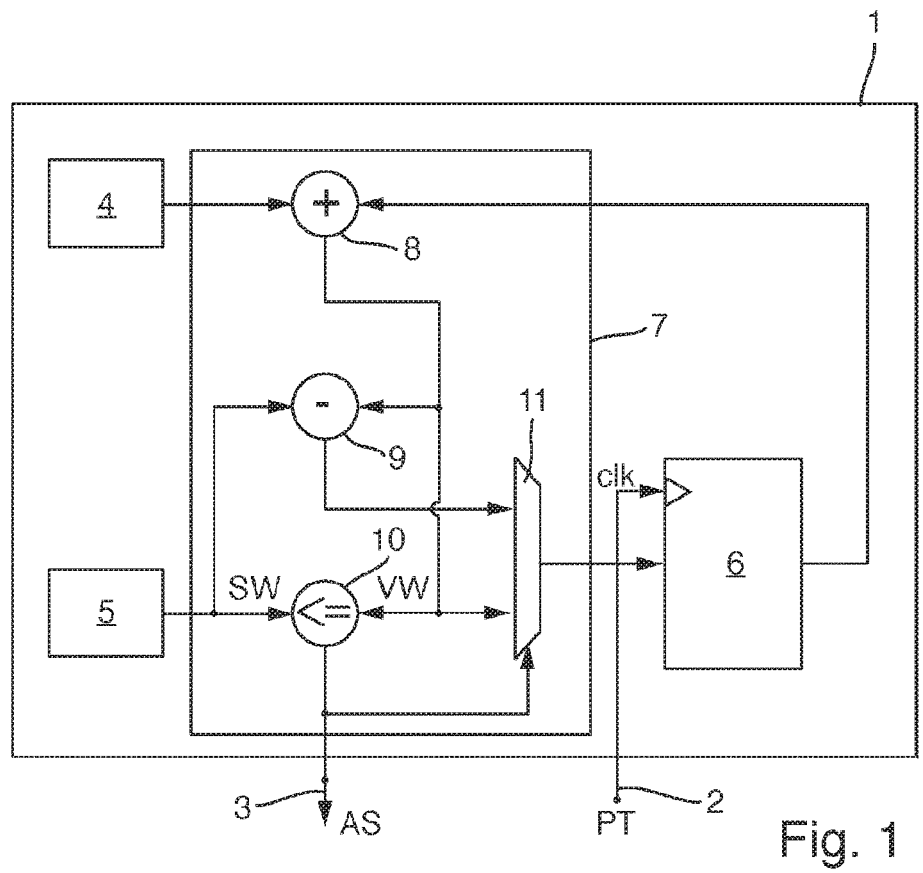
FIG. 1 shows a circuit for generating a sampling signal for a UART interface and FIG. 2 shows a UART interface having the circuit shown in FIG. 1.
Figure 2:
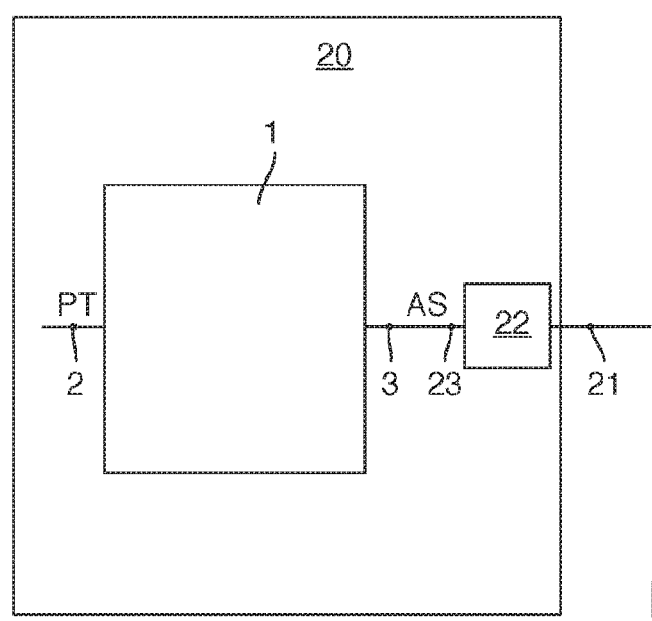

FIG. 1 shows a circuit 1 for generating a sampling signal AS for or as part of a UART interface 20 (see FIG. 2).

The circuit 1 has an input terminal 2 designed to receive a peripheral clock PT. The peripheral clock PT can be for example a clock or clock signal used in the peripheral area of the UART interface 20, for example a clock signal used for supplying a clock to a microprocessor, not depicted.

The circuit 1 further has an output terminal 3 designed to output the sampling signal AS.

The circuit 1 further has a bit rate memory 4 designed to store a value corresponding to a desired bit rate of the UART interface 20.

The circuit 1 further has a peripheral clock memory 5 designed to store a value corresponding to a frequency of the peripheral clock PT.

The circuit 1 further has a sum memory 6 designed to store a sum value.

The circuit 1 further has a computing unit 7 designed to take the values stored in the memories 4 and 5 as a basis for generating the sampling signal AS at a desired frequency, wherein the frequency is consistent with a desired bit rate.

The computing unit 7 has a summator 8 designed to sum the sum value stored in the sum memory 6 and the value stored in the bit rate memory 4 in order to output the sum at an output terminal as a comparison value VW.

The computing unit 7 further has a subtractor 9 designed to form a difference between the value stored in the peripheral clock memory 5 and the sum output by the summator 8 and to output the difference at its output terminal.

The computing unit 7 further has a comparator 10 designed to compare the value stored in the peripheral clock memory 5 with the comparison value VW and to take the result of the comparing as a basis for generating the sampling signal AS at a first or second level at its output terminal, which is connected to the output terminal 3 of the circuit 1.

The computing unit 7 further has a multiplexer 11 that has a control input connected to the output terminal of the comparator 10, that has its first input connected to the output terminal of the subtractor 9, that has its second input connected to the output terminal of the summator 8 and that takes a state of a signal present at its control input as a basis for outputting either the signal present at its first input or the signal present at its second input at its output terminal.

The sum memory 6 is in the form of an edge controlled register, wherein a clock input of the register has the peripheral clock PT applied to it and an input terminal of the register is connected to the output terminal of the multiplexer 11.

The operation of the circuit 1 shown in FIG. 1 is explained below with reference to an example. In this case, it should be assumed that the peripheral clock has a frequency of 100 MHz and the bit rate is set to 4 MHz.

The peripheral clock memory 5 stores the value 100 for this case, and the bit rate memory 4 stores the value 4*16=64. The sampling is thus effected with 16-fold oversampling in the present case.

At the beginning, the sum memory contains the value 0. The comparison value VW is 64. Since the comparison value VW of 64 is less than the value of 100 stored in the peripheral clock memory 5, the multiplexer 11 outputs the value of 64 present at the output of the summator 8 at its output.

On the rising edge of the first clock pulse, the value of 64 output by the multiplexer 11 is transferred to the sum memory 6. The sum memory 6 subsequently outputs the stored value of 64 at its output, so that the comparison value VW obtained is the value 128. At the output of the subtractor, the value 28 is obtained. Since the comparison value VW is now greater than the value of 100 stored in the peripheral clock memory 5, the multiplexer 11 outputs the value of 28 present at the output of the subtractor 8 at its output. The level at the output terminal 3 of the circuit 1 and hence also the level of the sampling signal AS changes its state.

On the rising edge of the second clock pulse of the peripheral clock PT, the value 28 is transferred to the sum memory 6. The sum memory 6 subsequently outputs the stored value of 28 at its output, so that the comparison value VW obtained is the value 92. Since the comparison VW is now again less than the value of 100 stored in the peripheral clock memory 5, the multiplexer 11 outputs the value of 92 present at the output of the adder 8 at its output. The level at the output terminal 3 of the circuit 1 and hence also the level of the sampling signal AS changes its state.

On the rising edge of the third clock pulse of the peripheral clock PT, the value 92 is transferred to the sum memory 6. The sum memory 6 subsequently outputs the stored value of 92 at its output, so that the comparison value VW obtained is the value 156. At the output of the subtractor, the value 56 is obtained. Since the comparison value VW is greater than the value of 100 stored in the peripheral clock memory 5, the multiplexer 11 outputs the value of 56 present at the output of the subtractor 9 at its output. The level at the output terminal 3 of the circuit 1 changes its state.

On the rising edge of the fourth clock pulse of the peripheral clock PT, the value 56 is transferred to the sum memory 6, etc.

In the sum memory 6, the following sequence of numbers is obtained in step with the peripheral clock PT: 0, 64, 28, 92, 56, 20, 84, 48, 12, 76, etc.

Accordingly, the sampling signal AS is generated with the following states: 0, 1, 0, 1, 1, 0, 1, 1, 0, 1, etc.

FIG. 2 shows a UART interface 20 having the circuit 1 shown in FIG. 1.

The UART interface 20 has a conventional data transmission terminal 21. The UART interface 20 further has a conventional data sampling unit 22 having a sampling control terminal 23, wherein the data sampling unit 22 is designed to take a sampling signal AS present at the sampling control terminal 23 as a basis for sampling a signal present at the data transmission terminal 21. The circuit 1 shown in FIG. 1 has its output terminal 3 connected to the sampling control terminal 23 of the data sampling unit 22.

According to the invention, the desired bit rate or the frequency of the peripheral clock is written to the memories or registers 4 and 5 in "plain text". The sum memory 6, which serves as an accumulator, sums the value stored in the memory 4 in the peripheral clock. Whenever the value in the accumulator 6 exceeds the value stored in the memory 5 or is the same as the value stored in the memory 5, the frequency of the peripheral clock is deducted from the accumulator content. The overflows are used as an oversampling bit rate clock. The maximum error for the circuit 1 is 1/peripheral clock even after 8 data bits, for example 10 ns at 100 MHz. The maximum error is below 6.25% per bit for arbitrary bit rates up to the maximum limit of peripheral clock/16, but this error does not add up for successive bits. Therefore, arbitrary bit rates are realizable directly without conversion and without errors that need to be taken into consideration.

What is claimed is:

1. A circuit for generating a sampling signal for a UART interface, the circuit comprising:

an input terminal designed to receive a peripheral clock;
an output terminal designed to output the sampling signal;
a bit rate memory designed to store a value corresponding to a desired bit rate of the UART interface;
a peripheral clock memory designed to store a value corresponding to a frequency of the peripheral clock;
a sum memory designed to store a sum value; and
a computing unit designed to:
compare a comparison value, which is dependent on the sum value stored in the sum memory, with a threshold value, which is dependent on the value stored in the peripheral clock memory,
take the result of the comparison as a basis for generating the sampling signal at a first level or a second level, and
in step with the peripheral clock and on the basis of the result of the comparison, either alter the sum value stored in the sum memory by the value stored in the bit rate memory or alter the sum value stored in the sum memory by a value that is dependent on the value stored in the peripheral clock memory,
the computing unit is further designed, in step with the peripheral clock, to:
compare the comparison value with the threshold value in regard to whether the comparison value is greater than/equal to or less than the threshold value,
if the comparison value is less than the threshold value, increase the sum value stored in the sum memory by the value stored in the bit rate memory, and
if the comparison value is greater than or equal to the threshold value, set the sum value stored in the sum memory to a value consistent with a difference between the comparison value and the threshold value.

2. The circuit as claimed in claim 1, wherein
the bit rate memory is designed to store a value consistent with an integer multiple of the desired bit rate of the UART interface.

3. The circuit as claimed in claim 1, wherein
the peripheral clock memory is designed to store a value consistent with the frequency of the peripheral clock.

4. The circuit as claimed in claim 1, wherein
the comparison value is consistent with a sum of the sum value stored in the sum memory and the value stored in the bit rate memory.

5. A circuit for generating a sampling signal for a UART interface, the circuit comprising:

an input terminal designed to receive a peripheral clock;
an output terminal designed to output the sampling signal;
a bit rate memory designed to store a value corresponding to a desired bit rate of the UART interface;
a peripheral clock memory designed to store a value corresponding to a frequency of the peripheral clock;
a sum memory designed to store a sum value; and
a computing unit designed to:
compare a comparison value, which is dependent on the sum value stored in the sum memory, with a threshold value, which is dependent on the value stored in the peripheral clock memory,
take the result of the comparison as a basis for generating the sampling signal at a first level or a second level, and
in step with the peripheral clock and on the basis of the result of the comparison, either alter the sum value stored in the sum memory by the value stored in the bit rate memory or alter the sum value stored in the sum memory by a value that is dependent on the value stored in the peripheral clock memory;
a summator designed to sum the sum value stored in the sum memory and the value stored in the bit rate memory in order to output the sum at its output terminal as the comparison value;
a subtractor designed to form a difference between the value stored in the peripheral clock memory and the sum output by the summator and to output the difference at its output terminal;
a comparator designed to compare the value stored in the peripheral clock memory with the comparison value and to take the result of the comparing as a basis for generating the sampling signal at the first level or the second level at its output terminal; and
a multiplexer that has its control input connected to the output terminal of the comparator, that has its first input connected to the output terminal of the subtractor, that has its second input connected to the output terminal of the summator and that takes a state of the sampling signal output by the comparator as a basis for outputting either the signal present at its first input or the signal present at its second input at its output terminal,
wherein the sum memory is in the form of a clock controlled register, wherein a clock input of the register has the peripheral clock applied to it and an input terminal of the register is connected to the output terminal of the multiplexer.

6. A UART interface, comprising:
at least one data transmission terminal;
a data sampling unit having a sampling control terminal, wherein the data sampling unit is designed to take a sampling signal present at the sampling control terminal as a basis for sampling a signal present at the data transmission terminal; and
a circuit as claimed in claim 1, wherein
the output terminal of the circuit is connected to the sampling control terminal of the data sampling unit.

* * * * *